(12) United States Patent
Tabassi et al.

(10) Patent No.: US 7,963,762 B2
(45) Date of Patent: Jun. 21, 2011

(54) INJECTION MOLDING APPARATUS HAVING A VALVE PIN COUPLING

(75) Inventors: Payman Tabassi, Rockwood (CA); Ryan Smith, Guelph (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 37 days.

(21) Appl. No.: 12/619,547

(22) Filed: Nov. 16, 2009

(65) Prior Publication Data
US 2010/0124579 A1 May 20, 2010

Related U.S. Application Data

(60) Provisional application No. 61/115,827, filed on Nov. 18, 2008.

(51) Int. Cl.
*B29C 45/23* (2006.01)
(52) U.S. Cl. .......... 425/562; 425/563; 425/564
(58) Field of Classification Search ......... 425/562, 425/563, 564, 565, 566
See application file for complete search history.

(56) References Cited

U.S. PATENT DOCUMENTS

| | | | |
|---|---|---|---|
| 3,887,312 A | 6/1975 | Seary | |
| 5,334,010 A | 8/1994 | Teng | |
| 6,309,208 B1 | 10/2001 | Kazmer et al. | |
| 6,638,049 B1 | 10/2003 | Moss et al. | |
| 7,121,820 B2 | 10/2006 | Tooman et al. | |
| 7,131,834 B2 | 11/2006 | Babin et al. | |
| 7,210,922 B1 | 5/2007 | Kohler | |
| 7,214,048 B2 * | 5/2007 | Kim | ............... 425/566 |
| 7,270,537 B2 | 9/2007 | Doyle et al. | |
| 7,275,923 B2 | 10/2007 | Tooman et al. | |
| 7,316,553 B2 | 1/2008 | Teng et al. | |
| 7,341,445 B2 | 3/2008 | Paris et al. | |
| 7,569,169 B2 * | 8/2009 | Vasapoli et al. | ............... 425/564 |
| 7,722,351 B2 | 5/2010 | Feick et al. | |
| 2005/0048162 A1 | 3/2005 | Teng et al. | |
| 2006/0222731 A1 | 10/2006 | Paris et al. | |
| 2009/0102099 A1 | 4/2009 | Feick et al. | |

FOREIGN PATENT DOCUMENTS

| | | |
|---|---|---|
| CA | 2366321 | 7/2001 |
| DE | 19611880 | 10/1997 |
| JP | 197924 | 6/1989 |
| JP | 2000-061995 | 2/2000 |
| JP | 2001-193596 | 7/2001 |
| JP | 3150283 U | 5/2009 |

(Continued)

OTHER PUBLICATIONS

"International Search Report and Written Opinion", International Application No. PCT/CA2008/001861 Jan. 20, 2009.

(Continued)

*Primary Examiner* — Tim Heitbrink
(74) *Attorney, Agent, or Firm* — Medler Ferro PLLC

(57) ABSTRACT

An injection molding apparatus is disclosed having an actuated part that is movable in forward and rearward directions with a coupling part attached thereto having a spring coupling and a magnetic coupling. A valve pin for opening and closing a mold gate is coupled to the coupling part to be movable with the actuated part. When the actuated part is moved and the valve pin experiences a stopping force, either a spring of the spring coupling is positioned for dampening the stopping force encountered by the valve pin or the magnetic coupling, which is magnetically coupled to the actuated part and/or the valve pin, decouples from the actuated part or the valve pin to limit or prevent continued movement of the valve pin with the actuated part.

15 Claims, 7 Drawing Sheets

FOREIGN PATENT DOCUMENTS

| | | |
|---|---|---|
| KR | 10-0514235 | 9/2005 |
| KR | 100655750 | 12/2006 |
| WO | WO-2006/080807 | 8/2006 |
| WO | WO 2009/120534 | 10/2009 |

OTHER PUBLICATIONS

Baumann, Martin et al., "Electrically Actuated Valve Gates: An Emerging Hot Runner Technology", *MoldMaking Technology* Aug. 2008 , 31-34.

Gray, Stephen et al., "Plate Actuated Hot Runner Valve Gates for Improved Part Quality and Molding Process Consistency", *ANTEC* 2009 , 2991-2995.

"International Search Report and Written Opinion", Int'l Appl No. PCT/CA2009/001067 Oct. 7, 2009.

* cited by examiner

INJECTION MOLDING APPARATUS HAVING A VALVE PIN COUPLING

CROSS-REFERENCE TO RELATED APPLICATION

This application claims the benefit under 35 U.S.C. §119(e) of U.S. Appl. No. 61/115,827 filed Nov. 18, 2008, which is incorporated by reference herein in its entirety.

FIELD OF THE INVENTION

The present invention relates to injection molding, and more particularly, to an injection molding apparatus having a valve pin.

BACKGROUND OF THE INVENTION

Injection molding apparatuses, such as hot halves and hot runners, commonly use valve pins to control flow of molding material. Improper valve pin operation can cause damage to a valve pin itself or to surrounding components, such as a nozzle tip, a nozzle tip liner, a nozzle tip guide sleeve, or a mold gate. For example, on the close stroke, when a downstream tip of a valve pin is pushed into the mold gate or the area that surrounds the mold gate, the tip of the valve pin may collide with a foreign object, such as a contaminant, blocking the mold gate. Unexpectedly frozen molding material in the mold gate area can also act as a blockage. The result is that damage to the valve pin or surrounding components can occur. Similarly, a valve pin can seize before reaching the end of its close stroke, whether this be induced by material seeping between surfaces having a high-tolerance sliding relationship or by some other cause. These problems can be exasperated when several valve pins are ganged together to be actuated in unison by, for example, a common valve pin plate. In this case, the entire force transmitted by the actuator(s) to all the valve pins may be received by a single valve pin that encounters a blockage, becomes seized, or encounters some other motion inhibiting condition.

In addition, it is sometimes desired to take a valve pin out of service when a mold cavity, a valve pin, a heater, a mold gate, or other related component wears or fails. Replacement of a damaged valve pin or manual disengagement of a valve pin can be time consuming and costly.

BRIEF SUMMARY OF THE INVENTION

Embodiments hereof are directed to an injection molding apparatus having an actuated part that is movable in forward and rearward directions with a coupling part attached thereto having a spring coupling and a magnetic coupling. A valve pin for opening and closing a mold gate is coupled to the coupling part to be movable with the actuated part. When the actuated part is moved and the valve pin experiences a stopping force, either a spring of the spring coupling is positioned for dampening the stopping force encountered by the valve pin or the magnetic coupling, which is magnetically coupled to the actuated part and/or the valve pin, decouples from the actuated part or the valve pin to limit or prevent continued movement of the valve pin with the actuated part.

BRIEF DESCRIPTION OF THE FIGURES

The foregoing and other features and advantages of the invention will be apparent from the following description of embodiments thereof as illustrated in the accompanying figures. The accompanying figures, which are incorporated herein and form a part of the specification, further serve to explain the principles of the invention and to enable a person skilled in the pertinent art to make and use the invention. The figures may not be to scale.

DETAILED DESCRIPTION OF THE FIGURES

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
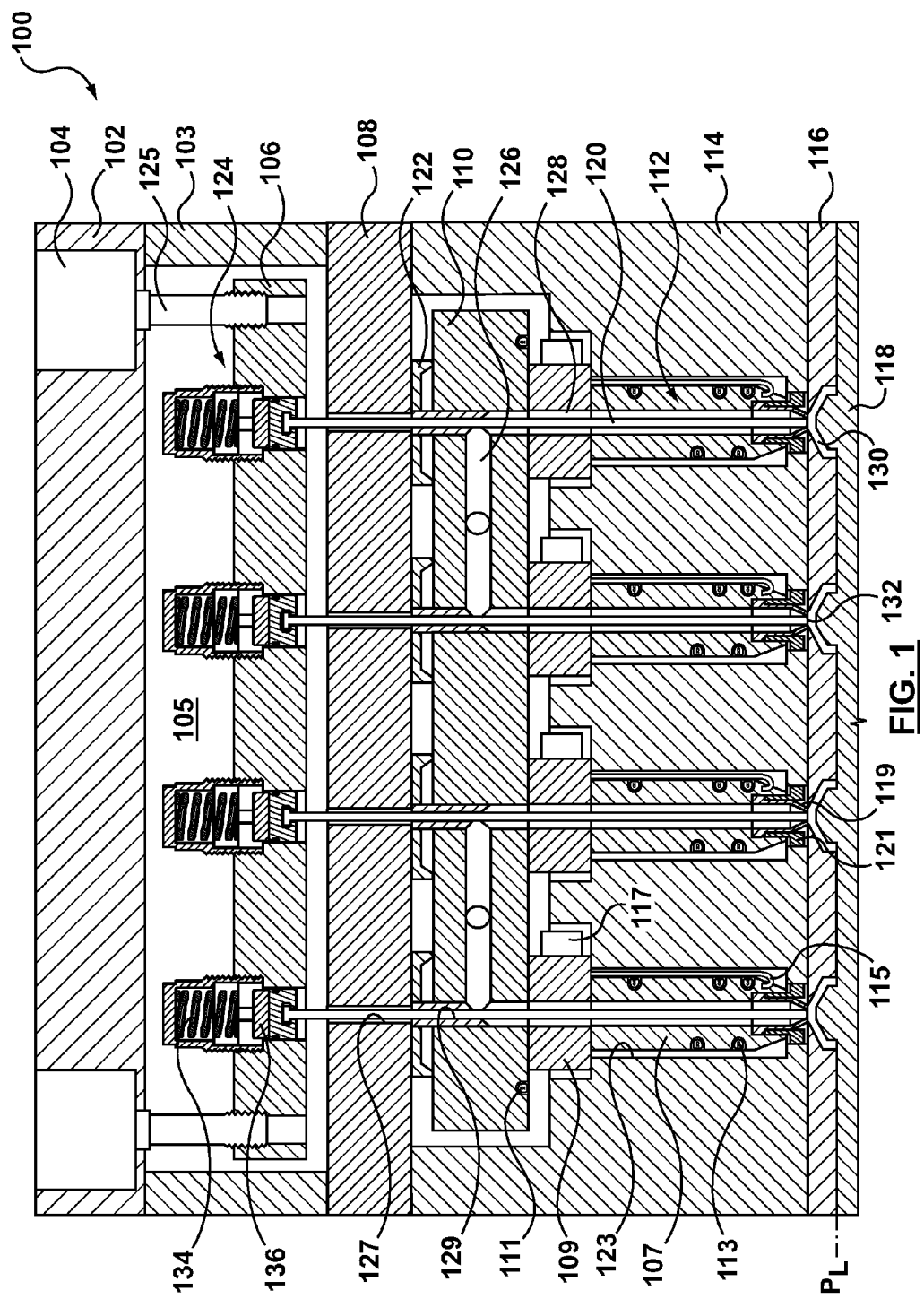
FIG. 1 sectional view of an injection molding apparatus according to an embodiment of the present invention.

Embodiments hereof relate to, among other things nozzles and components which can be used in an injection molding apparatus such as the injection molding apparatus 100 shown in FIG. 1. The features and aspects described for the other embodiments can be used accordingly with the present embodiment. In the following description, "downstream" is used with reference to the direction of mold material flow from an inlet of the injection molding system to a mold cavity, whereas "upstream" is used with reference to the opposite direction. Similarly, "forward" is used with reference to a direction towards a parting line between a mold cavity plate and a mold core, whereas "rearward" is used with reference to a direction away from the parting line.

Injection molding apparatus 100 includes actuator plate 102 and an actuator support plate 103, actuators 104, a valve pin plate 106, a back plate 108, a manifold 110, nozzles 112, a mold plate 114, a cavity plate 116, a core plate 118, valve pins 120, valve pin bushings 122, and spring-magnet couplings 124. Injection molding apparatus 100 can include any number of manifolds and nozzles, in any configuration. In this embodiment, one manifold is shown for simplicity. Injection molding apparatus 100 can include additional components, such as additional mold plates, alignment dowels, mold gate inserts, cooling channels, bolts, lifting holes, among others without departing from the scope hereof.

Actuator plate 102 has openings for accommodating actuators 104. If actuators 104 depend on a working fluid for operation, i.e., pneumatic or hydraulic types, fluid conduits (not shown) can be provided in actuator plate 102. Should actuators 104 be electric or magnetic or of some other design, electrical conduits (not shown) can be provided in actuator plate 102. Actuator support plate 103 forms an enclosure 105 between actuator plate 102 and back plate 108 to accommodate movement of valve pin plate 106 therein.

Actuators 104 can translate valve pin plate 106 between an open and closed position by linear motion, e.g., a pneumatic piston, or rotary motion, e.g., an electric screw drive. To accomplish such movement, each actuator 104 has a stationary part, e.g., a housing or cylinder, connected to actuator plate 102 and also has a movable part 125, e.g., a piston or part extending from the piston, connected to valve pin plate 106. The number of actuators is a design choice, and in other embodiments more or fewer actuators can be used. Any style of actuator is suitable, provided that it can translate the valve pin plate 106 and valve pins 120 between an open and closed position. In FIG. 1, valve pin plate 106 is positioned such that valve pins 120 are in the closed position seated within mold gates 132.

Valve pin plate 106 is connected to movable part 125 of each actuator 104. Valve pin plate 106 has a plurality of openings associated with spring-magnet couplings 124. Valve pin plate 106 moves in an axial longitudinal direction toward manifold 110, and away from manifold 110 in response to the actuation of the actuators 104. Movement of valve pin plate 106 and associated valve pins 120 toward manifold 110 and mold gates 132 can be described as closing CS, whereas movement of valve pin plate 106 and associated valve pins 120 away from manifold 110 and mold gates 132 can be described as opening OS. Valve pin plate 106 need not be a plate as such, but can be any rigid member capable of connecting one or more actuators to a plurality of spring-magnet couplings 124. In other embodiments, the valve pin plate 106 is an assembly of stacked plates.

Back plate 108 is disposed between valve pin plate 106 or actuator support plate 103 and valve pin bushings 122 and serves to secure valve pin bushings 122 against manifold 110. Back plate 108 has several bores 127 through which valve pins 120 extend.

Manifold 110 defines a manifold channel 126 (partially shown) and includes a manifold heater 111. Manifold channel 126 receives a melt stream of moldable material, e.g., plastic melt, from an inlet component (not shown) or an upstream manifold (not shown). Manifold heater 111 can be of any design, such as the insulated resistance wire illustrated. It should also be mentioned that, because of the plate interconnections (not shown), manifold 110 is stationary in the actuation direction, i.e., fixed in a longitudinal direction, relative to the stationary parts of actuators 104.

Nozzles 112 are abutted against manifold 110 and each nozzle 112 defines one of a plurality of nozzle channels 128 in fluid communication with manifold channel 126 for delivering a melt stream of moldable material to mold cavities 130 via mold gates 132. In the embodiment shown in FIG. 1, each nozzle 112 includes a nozzle body 107, a nozzle flange 109, a nozzle heater 113 embedded in nozzle body 107, a thermocouple 115, a terminal end 117 for connecting the heater to a power source (not shown), a nozzle tip 119 of a thermally conductive material and a tip retainer 121 of a less thermally conductive material than nozzle tip 119. Nozzles 112 in combination with manifold 110 may be referred to as a hot runner system.

Mold plate 114 has wells or openings 123 to accommodate and support nozzles 112. Wells 123 are sized to provide an insulative air space between nozzles 112 and mold plate 114.

Cavity plate 116 and core plate 118 define mold cavities 130, and cavity plate 116 defines mold gates 132 leading into mold cavities 130. Cavity plate 116 and core plate 118 are separable along a parting line $P_L$ to allow ejection of molded products from mold cavities 130. In other embodiments, a single cavity can be fed molding material by one or more nozzles 112.

Each of the valve pins 120 extends from a spring-magnet coupling 124 to a mold gate 132 through back plate 108, valve pin bushing 122 and nozzle channel 128 for controlling the flow of molding material through the respective mold gate 132 and into the respective mold cavity 130 when actuated between an open and closed position.

As noted above, each valve pin bushing 122 is held to manifold 110 by back plate 108. Each valve pin bushing 122 includes a disc-shaped main body and a cylindrical bushing portion connected to and extending from the main body and into manifold 110. Each valve pin bushing 122 has a valve pin bore 129, which creates a seal with valve pin 120 while still allowing valve pin 120 to slide in an axial direction.

Each spring-magnet coupling 124 couples a respective valve pin 120 to valve pin plate 106. In the current embodiment, a spring 134 of spring-magnet coupling 124 transmits movement of valve pin plate 106 to valve pin 120 when the valve pins are being closed, i.e. moved towards mold gates 132 in a closing direction CS, whereas a magnet 136 of spring-magnet coupling 124 transmits movement of valve pin plate 106 to valve pin 120 when the valve pins are being opened, i.e. moved away from mold gates 132 in a opening direction OS.

In the gating style depicted, a forward movement of valve pin 120 closes mold gate 132 restricting the flow of moldable material into mold cavity 130, whereas a rearward movement of valve pin 120 opens mold gate 132, allowing the flow of moldable material to enter mold cavity 130. In an alternative embodiment, the directions associated with opening and closing the valve gates are reversed such that forward movement of the valve pins opens the mold gates and the rearward movement of the valve pins closes the mold gates. Regardless of the direction of actuation used to open and close the mold gates 132, when one or more valve pins 120 encounters a stopping force greater than a predetermined threshold whereby damage may occur to mold gate 132, valve pin 120 or any other associated component, the associated spring-magnet couplings 124 compensate by stopping or reducing the movement of the affected valve pin(s) 120, which in turn mitigates potential damage while still allowing the remaining valve pin(s) 120 not experiencing a stopping force beyond the predetermined threshold to continue to move in response to actuation of valve pin plate 106 by actuators 104.

Figure 2:
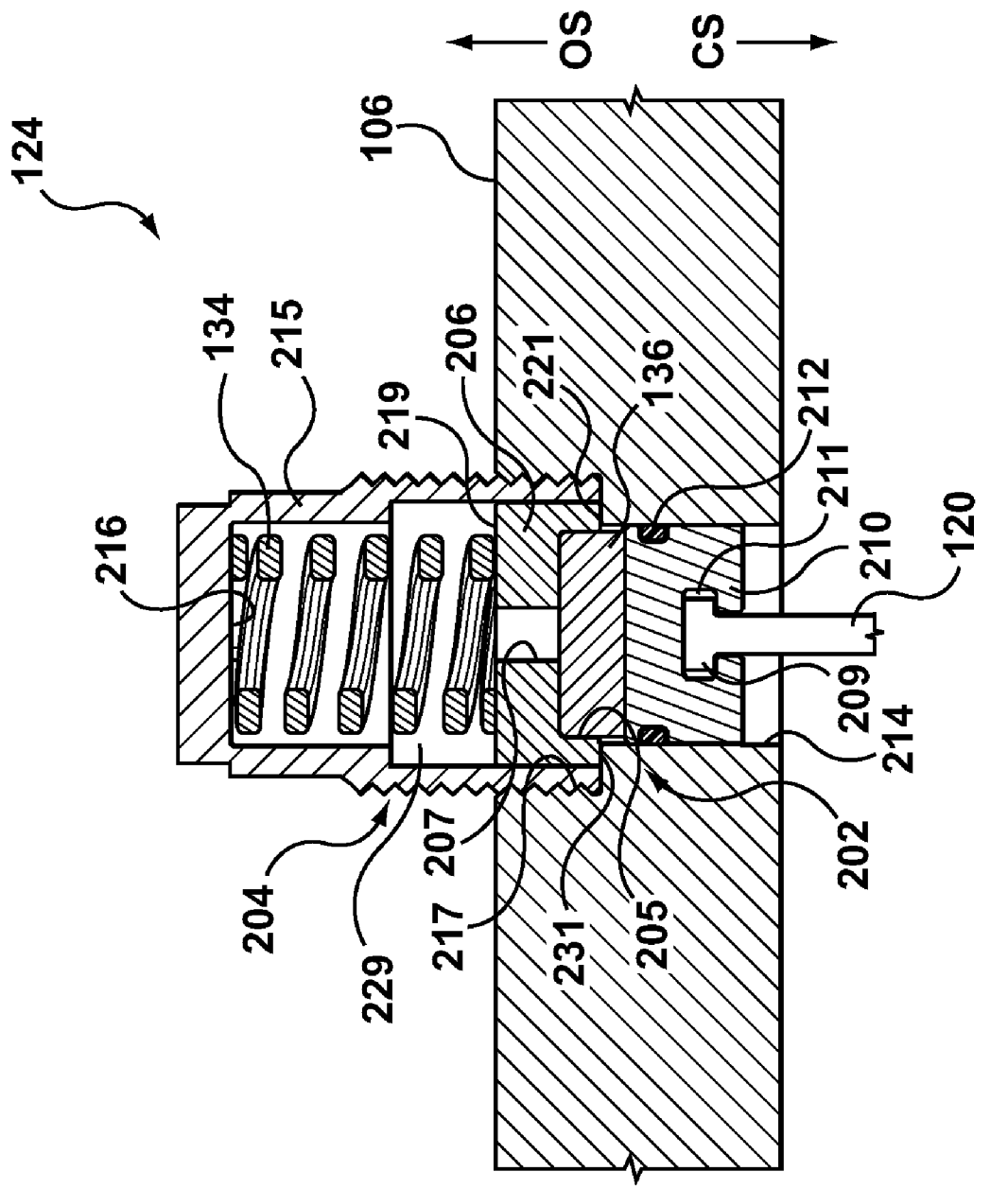
FIG. 2 is an enlarged sectional view of a spring-magnet coupling in a portion of the injection molding apparatus shown in FIG. 1 with a valve pin in a position of normal operation.

FIG. 2 illustrates an enlarged sectional view of spring-magnet coupling 124 shown in a portion of injection molding apparatus 100 of FIG. 1 with valve pin 120 shown under normal operating conditions. Spring-magnet coupling 124 is coupled to valve pin 120 and, in this embodiment, valve pin plate 106 in a manner to accommodate stopping forces acting upon valve pin 120 in either the opening direction OS or closing direction CS.

Spring-magnet coupling 124 includes a magnetic coupling 202 and a spring coupling 204. Magnetic coupling 202 and spring coupling 204 are connected in series to transmit the movement of valve pin plate 106 to valve pin 120. The series connection means that the force is transmitted between valve pin plate 106 and valve pin 120 through both magnetic coupling 202 and spring coupling 204. In the embodiment of FIGS. 1-4, magnetic coupling 202 is positioned between valve pin 120 and spring coupling 204, such that valve pin 120 is coupled to magnetic coupling 202. Magnetic coupling 202 is in turn connected to spring coupling 204, and spring coupling 204 is connected to valve pin plate 106.

Magnetic coupling 202 includes a magnet holder 206 and magnet 136 that is located in a bore 205 within a downstream surface of magnet holder 206. Although magnet 136 is shown only partially seated within bore 205 such that a portion of magnet 136 extends forward of bore 205, in another embodiment magnet 136 may be fully seated within bore 205. Magnet holder 206 is made of magnetically responsive material, e.g., ferromagnetic material, and as such is connected to magnet 136 by an attractive magnetic force. Magnet holder 206 has a tool bore 207 extending therethrough into which a tool (not shown) can be inserted to manually separate magnet 136 from magnet holder 206. Magnet 136 can be a permanent magnet, e.g., a neodymium magnet or a samarium-cobalt magnet, an electromagnet, or a combination of such, provided that an attractive magnetic force can be generated between magnet 136 and magnet holder 206.

Valve pin 120 is coupled to a valve pin holder 210 by way of a slot 211 into which a head portion 209 of valve pin 120 is inserted. Valve pin holder 210 has an O-ring 212 disposed in a groove in the circumference of valve pin holder 210. O-ring 212 is in contact with a bore 214 in valve pin plate 106 in which valve pin holder 210 can slide and serves to prevent dust or other debris from coming between magnet 136 and valve pin holder 210. Valve pin holder 210 is made of magnetically responsive material, e.g., ferromagnetic material, and is coupled to magnet 136 by magnetic attraction. In another embodiment (not shown), the valve pin holder 210 may be omitted and head portion 209 of valve pin 120 may be made of magnetically responsive material to be directly coupled to magnet 136 by an attractive magnetic force therebetween.

In the current embodiment, magnet holder 206, magnet 136 and valve pin holder 210 are designed such that the attractive magnetic force between magnet 136 and magnet holder 206 is greater than the attractive magnetic force between magnet 136 and valve pin holder 210. The greater magnetic attraction between magnetic holder 206 and magnet 136 ensures magnet 136 remains connected to magnet holder 206 if valve pin holder 210 decouples from magnet 136. In another embodiment (not shown), the strength of magnetic attraction between magnet 136 and valve pin holder 210 is greater than the strength of magnetic attraction between magnet 136 and magnet holder 206 such that magnet 136 decouples from magnet holder 206.

Spring coupling 204 includes a spring holder, or spring retainer 215 and spring 134. Spring retainer 215 contains threads on an outer surface which are complementary to threads in valve pin plate 106. Spring retainer 215 and valve pin plate 106 are joined together by a threaded connection 217. Although spring retainer 215 and valve pin plate 106 are shown connected by threads, it will be appreciated by one of ordinary skill in the art that a similar connection could be achieved by other means. Spring 134 is disposed within a chamber 229 of spring retainer 215 and is held in place between a forward facing inner surface 216 of spring retainer 215 and a rearward facing surface 219 of magnet holder 206. In the embodiment of FIG. 2, magnet holder 206 is disposed within a forward end of chamber 229 of spring retainer 215 and has a forward facing surface 231 seated against a shoulder 221 of a bore 214 in valve pin plate 106. Spring 134 may be in compression and thus may bias magnet holder 206 of the magnetic coupling 202 forward against shoulder 221 of bore 214. Spring 134 exerts a biasing force between spring retainer 215 and valve pin holder 210 and valve pin 120 via the magnetic coupling 202.

Figure 3:
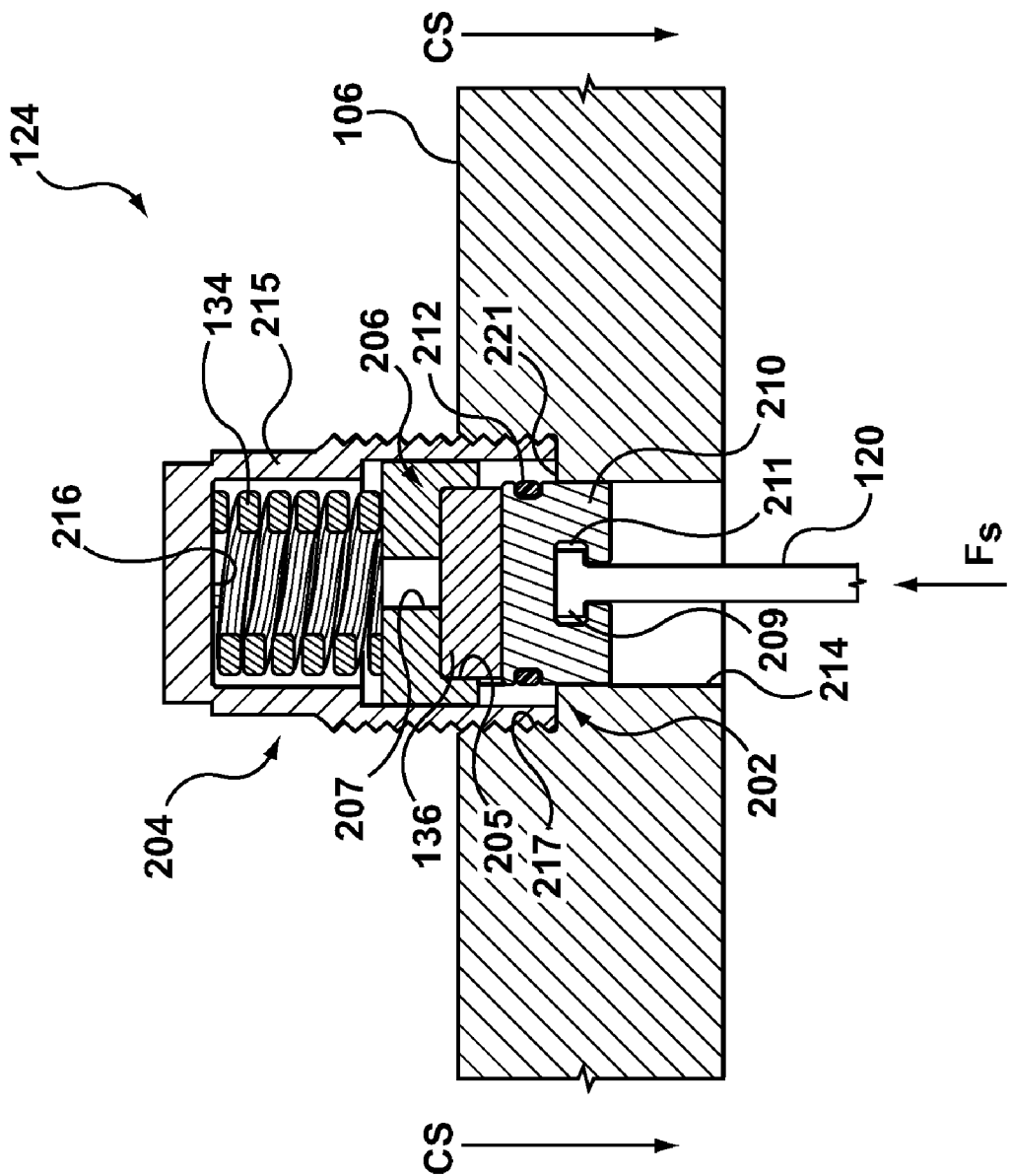
FIG. 3 illustrates the spring-magnet coupling of FIG. 2 when the valve pin encounters a stopping force on a forward stroke.

Thus, as can be seen in FIG. 2 which depicts spring-magnet coupling 124 during normal operation. When valve pin plate 106 is actuated in the opening direction OS, the force of magnetic attraction between magnet 136 and valve pin holder 210 transfers the rearward movement of valve pin plate 106 to valve pin holder 210 thereby simultaneously actuating valve pin 120 and in the opening direction OS. Conversely, when valve pin plate 106 is actuated in the closing direction CS, the biasing force between spring 134 and magnet holder 206 transfers the forward movement of valve pin plate 106 to valve pin 120 through magnet 136 and valve pin holder 210 thereby simultaneously actuating valve pin 120 in the closing direction CS. FIG. 3 depicts spring-magnet coupling 124 of FIG. 2 during or after an actuation of valve pin plate 106 in the closing direction CS when one or more valve pins 120 experience a stopping force $F_S$. Non-limiting examples of operating conditions that may create a stopping force $F_S$ that acts upon valve pin 120 include an obstruction or contaminant at the mold gate (not shown), solidified molding material in the nozzle channel (not shown), seizing of valve pin 120 within valve pin bushing (not shown), failure of another component, or a mechanical lock used for taking the valve pin out of service. When valve pin 120 experiences a stopping force $F_S$ that meets or exceeds a threshold value while valve pin plate 106 is actuated in the closing direction CS, spring 134 compresses to reduce the force applied to valve pin 120. The compression of spring 134 within spring coupling 204 allows valve pin 120 experiencing the stopping force $F_S$ to remain stationary or to move a distance in the closing direction CS that is less than the distance moved by valve pin plate 106 and the remainder of the unaffected valve pins connected thereto. In other words, the compression of spring 134 dampens or absorbs some or all the stopping force $F_S$ experienced by the affected valve pin 120. Thus, although the nozzle (not shown) or other mold components associated with the affected valve pin 120 may not function normally; damage or other undesirable effects are reduced. The compensation of spring coupling 204 as a result of valve pin 120 encountering a stopping force $F_S$ as shown in FIG. 3 may only be temporary as valve pin 120 may push through the source of a stopping force $F_S$ over one or more opening and closing actuations of valve pin plate 106. On the other hand, if the stopping force $F_S$ experienced by valve pin 120 cannot be overcome, total stoppage of the affected valve pin 120 may occur.

Figure 4:
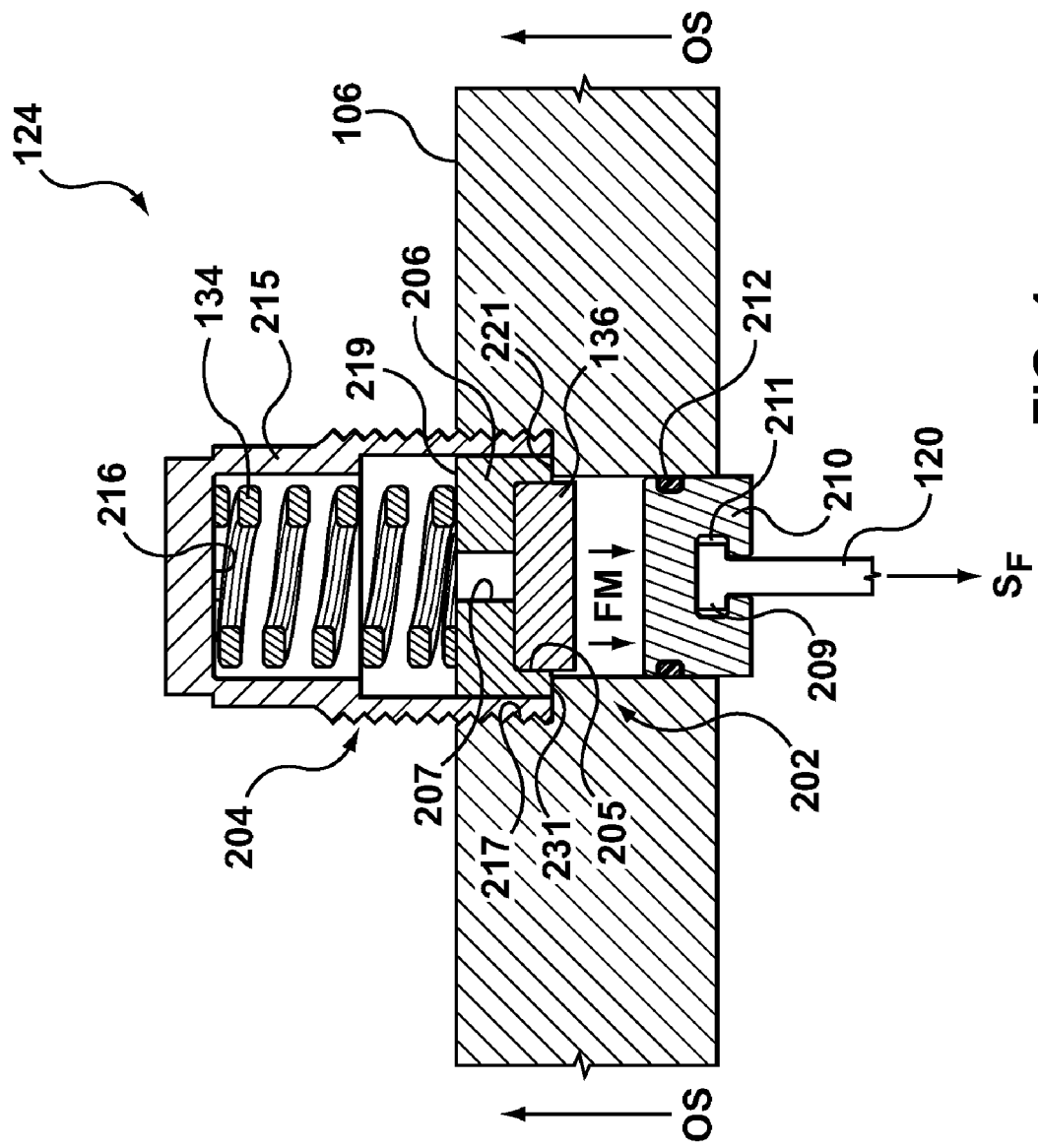
FIG. 4 illustrates the spring-magnet coupling of FIG. 2 when the valve pin encounters a stopping force on a rearward stroke.

FIG. 4 shows spring-magnet coupling 124 of FIG. 2 when one or more valve pins 120 experience a stopping force $S_F$ during or after an actuation of valve pin plate 106 in the opening direction OS. Non-limiting examples of operating conditions that may result in a stopping force $S_F$ that acts upon valve pin 120 include inadvertently or intentionally solidified molding material in the nozzle channel (not shown), a mechanical valve pin lock activated to prohibit the actuation of valve pin 120, seizing of valve pin 120 within the valve pin bushing (not shown), or failure of another component. When valve pin 120 experiences a stopping force $S_F$ while valve pin plate 106 is actuated in the opening direction OS that meets or exceeds a threshold value, the force of magnetic attraction $F_M$ between valve pin holder 210 and magnet 136 is overcome, and valve pin holder 210 decouples from magnet 136. Shoulder 221 in valve pin plate 106 acts as a stop during the decoupling action by limiting longitudinal movement of magnet holder 206 in the forward direction. The decoupling between magnet coupling 202 and valve pin holder 210 frees valve pin 120 experiencing the stopping force $S_F$ from movement with valve pin plate 106 such that the affected valve pin 120 remains stationary while valve pin plate 106 and the remainder of the unaffected valve pins connected thereto continue to move in the opening direction OS. Thus, although the nozzle (not shown) or other mold components associated with the affected valve pin 120 may not function normally; damage or other undesirable effects are reduced. The decoupling of valve pin holder 210 and magnet 136 shown in FIG. 4 may only be temporary as once valve pin plate 106 moves in the closing direction CS, magnetic attraction between magnet coupling 202 and valve pin holder 210 may reattach the affected valve pin 120 such that on subsequent movement of valve pin plate 106 in the opening direction OS, the affected valve pin 120 may pull through the source of the stopping force $S_F$. On the other hand, if the stopping force $S_F$ experienced by valve pin 120 cannot be overcome, complete stoppage of the affected valve pin 120 may occur such that the nozzle associated therewith is out of service.

Each of the opening direction OS and closing direction CS stopping forces, $S_F$ and $F_S$ respectively, can be limited by predetermining a threshold force at which magnet 136 decouples and a threshold force at which spring 134 compresses. For example, the spring constant and/or preload of spring 134 can be selected to establish a threshold spring force that the stopping force $F_S$ must exceed before spring 134 compresses thereby stopping or slowing the movement of valve pin 120. Likewise, the material of magnet 136 and surrounding components and/or the geometry thereof can be selected to establish a threshold attractive magnetic force that the stopping force $S_F$ must exceed before decoupling of valve pin holder 210 and magnet 136 occurs thereby suspending the movement of valve pin 120. The threshold spring force and threshold magnetic force can be selected independent of each other. In addition, the force response curves of the spring and magnet beyond the thresholds, i.e., after movement of valve pin 120 is affected, can also be designed as desired.

Figure 5:
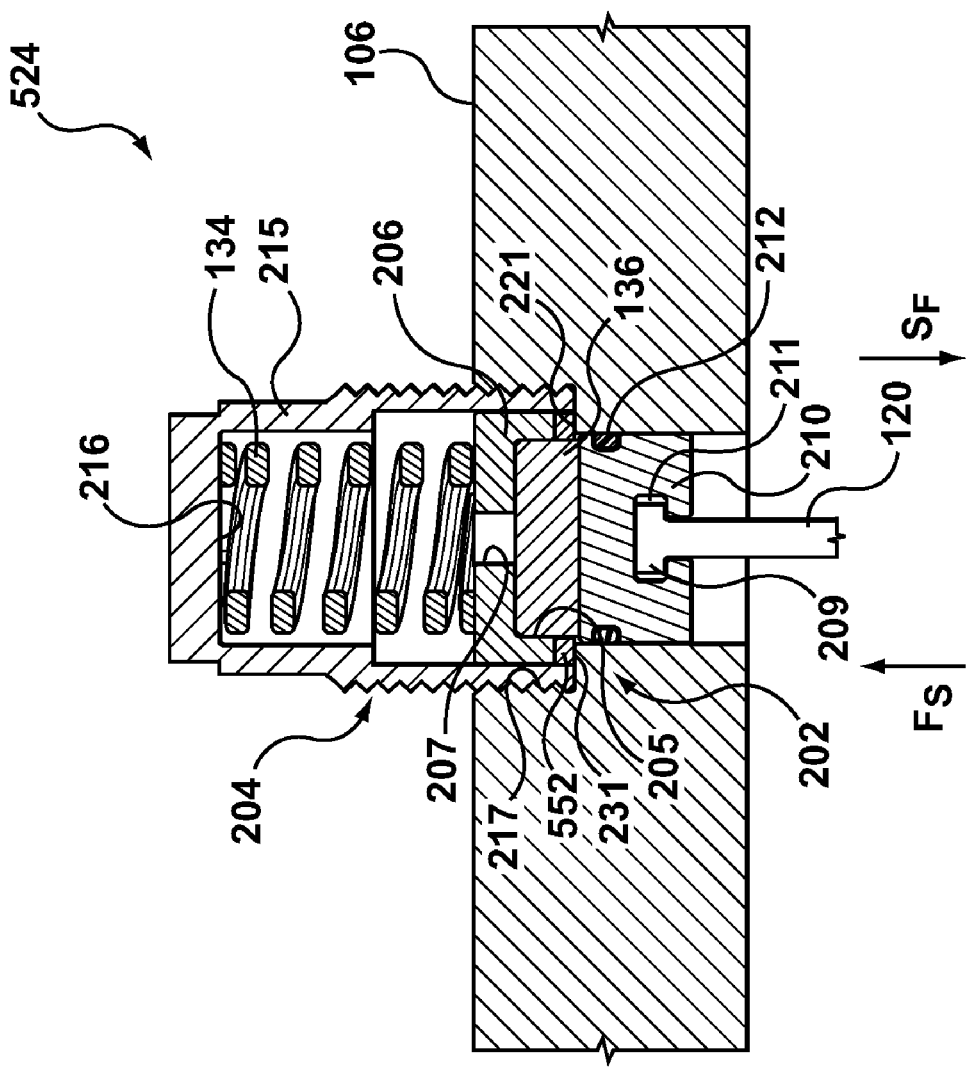
FIG. 5 is a sectional view of a spring-magnet coupling having an adjustment washer in a portion of an injection molding apparatus in accordance with another embodiment hereof

FIG. 5 is a sectional view of spring-magnet coupling 524 in accordance with another embodiment hereof that may be used in the injection molding apparatus 100 of FIG. 1. Features and aspects for the other embodiments can also be used with the present embodiment. Spring-magnet coupling 524 is similar to spring-magnet coupling 124 described with reference to FIGS. 2, 3, and 4 except for the addition of a spacing washer 552 that is located between magnet holder 206 and valve pin plate 106. Spacing washer 552 is provided to allow for adjusting a forward end position (not shown) of valve pin 120 so as to accurately set the longitudinal position of valve pin 120 within a mold gate (not shown). To accomplish this spacing washer 552 may be manufactured to a desired thickness or may be replaced by one or more spacing washers of different thicknesses to properly shim magnet holder 206, and subsequently valve pin holder 210 for accurate positioning of valve pin 120 within a mold gate (not shown). In other embodiments, a spacing washer is provided in other locations in series within the magnetic-spring coupling.

Figure 6:
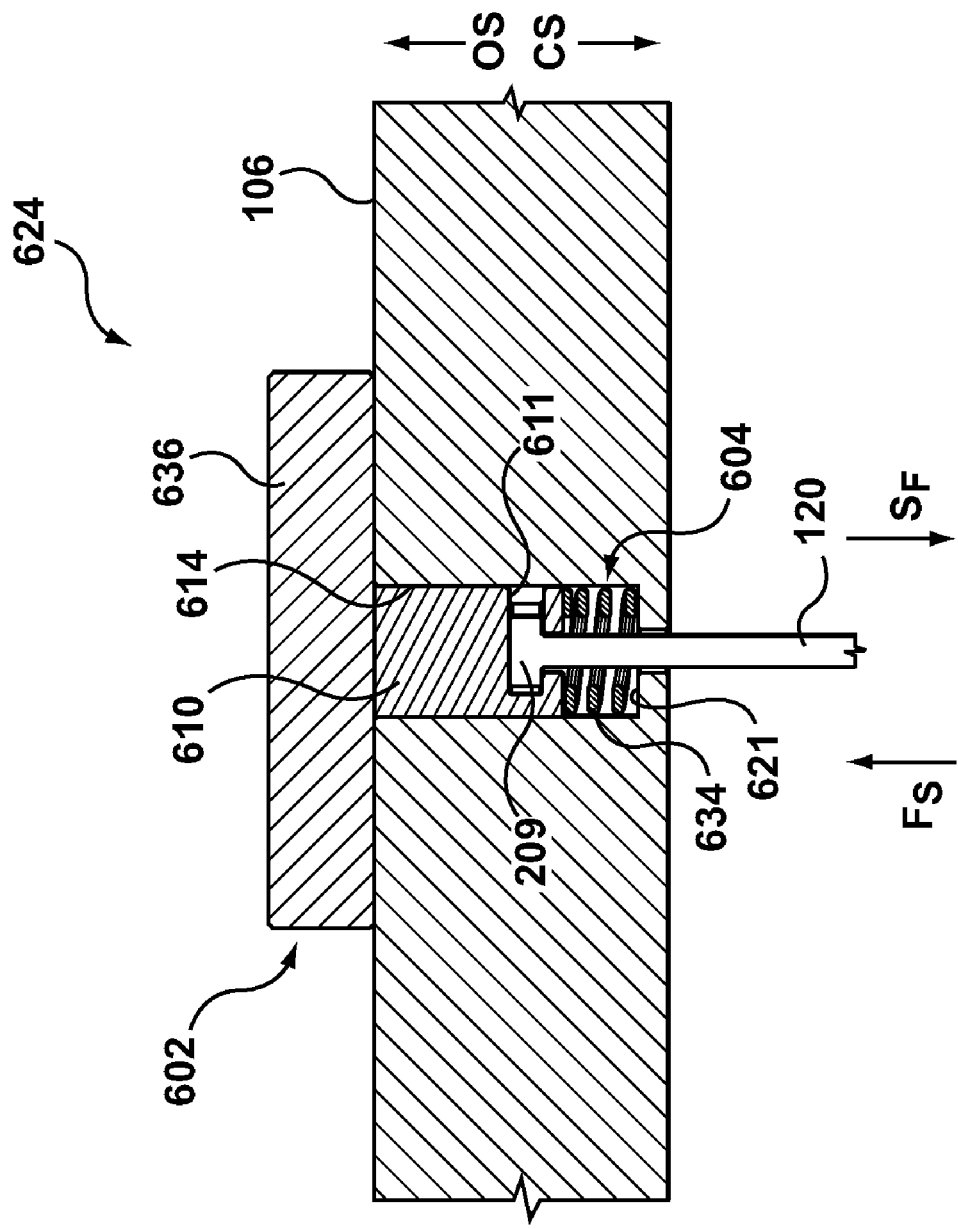
FIG. 6 is a sectional view of a reversed spring-magnet coupling in a portion of an injection molding apparatus in accordance with another embodiment hereof.

FIG. 6 is a sectional view of a spring-magnet coupling 624 in accordance with another embodiment hereof that may be adapted for use in the injection molding apparatus 100 of FIG. 1. Features and aspects of the other embodiments can also be used with the present embodiment. Spring-magnet coupling 624 includes a magnetic coupling 602 and a spring coupling 604 connected in series. Spring-magnet coupling 624 is similar to spring-magnet coupling 124 in the previous embodiments however in this embodiment the functionality of magnetic coupling 602 and spring coupling 604 is the reverse of the embodiments of FIGS. 1-5. In the embodiment shown in FIG. 6, spring coupling 604 compensates when a stopping force $S_F$ is experienced by one or more valve pins 120 when valve pin plate 106 is actuated in the opening direction OS, and the magnetic coupling 602 compensates when a stopping force $F_S$ is experienced by one or more valve pins 120 when valve pin plate 106 is actuated in the closing direction CS.

Magnetic coupling 602 includes a magnet 636 and a valve pin holder 610. Magnet 636 is held to valve pin plate 106 and valve pin holder 610 by magnetic attraction therebetween. Magnet 636 can be a permanent magnet e.g., a neodymium magnet or a samarium-cobalt magnet, an electromagnet, or a combination of such provided that an attractive magnetic force can be generated between magnet 636 and valve pin plate 106. Valve pin holder 610 is slidably disposed in a bore 614 of valve pin plate 106. Valve pin 120 is coupled to valve pin holder 610 by way of a slot 611 into which a head 209 of valve pin 120 is inserted.

Spring coupling 604 includes a spring 634 disposed between valve pin holder 610 and a shoulder 621 in bore 614 of valve pin plate 106. Spring 634 exerts a biasing force upon valve pin holder 610 against magnet 636 such that there is no axial movement of valve pin holder 610 within bore 614, however the biasing force generated by spring 634 upon valve pin holder 610 has no appreciable effect on the magnetic attractive force between magnet 636 and valve pin plate 106.

In operation, if one or more valve pins 120 encounter a stopping force $S_F$, as discussed elsewhere herein, when valve pin plate 106 is actuated in the opening direction OS, valve pin holder 610 decouples from magnet 636 and spring 634 compresses. The compression of spring 634 allows valve pin 120 experiencing the stopping force $S_F$ to remain stationary or move a distance in the opening direction OS that is less than the distance in the opening direction OS moved by valve pin plate 106 and the remainder of the unaffected valve pins connected thereto. In addition, the compression of spring 634 dampens or absorbs some or all the stopping force $S_F$ experienced by the affected valve pin 120. Likewise, if one or more valve pins 120 encounter a stopping force $F_S$ when valve pin plate 106 is actuated in the closing direction CS, as discussed elsewhere herein, magnet 636 decouples from the valve pin plate 106. The decoupling between magnetic coupling 602 and valve pin plate 106 allows valve pin 120 experiencing the stopping force $F_S$ to remain stationary while valve pin plate 106 and the remainder of the unaffected valve pins connected thereto continue to move in the closing direction CS. In either case, valve pin holder 610 slides within bore 614 accordingly. If valve pin 120 encounters no stopping forces during actuation in either the opening or closing direction, spring-magnet coupling 624 remains intact as depicted in FIG. 6.

Figure 7:
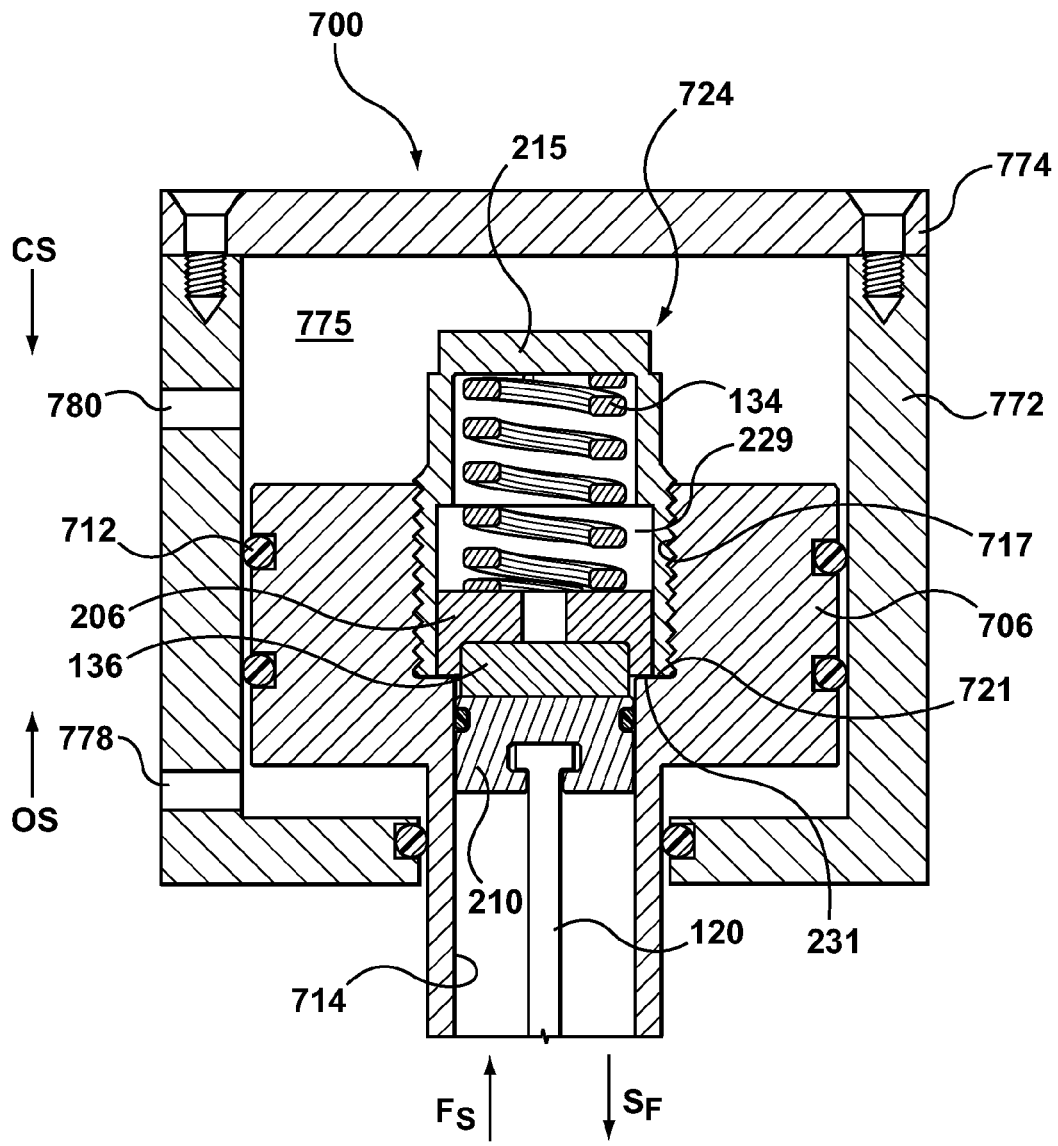
FIG. 7 is a sectional view of a spring-magnet coupling in an actuator in accordance with another embodiment hereof.

FIG. 7 is a sectional view of an embodiment of a spring magnetic coupling 724 with an actuator 700 in accordance with another embodiment hereof that may be adapted for use in the injection molding apparatus 100 of FIG. 1. Features and aspects of the other embodiments may be used with the present embodiment.

Actuator 700 includes a housing 772 and a cap 774 enclosing a space 775. A piston 706 resides in the space 775 and is slidable within housing 772 in a manner of a conventional piston cylinder arrangement. Fluid pressure applied to port 780 will cause piston 706 and valve pin 120 to actuate in the closing direction CS. Fluid pressure applied to port 778 will cause piston 706 to actuate in the opening direction OS. Fluid pressure may be hydraulic or pneumatic. Seals, such as O-rings 712, are provided to seal against actuator fluid leakage. Similar to the valve pin plate in the previous embodiments, piston 706 is an actuated part for moving the valve pin 120 to open or close a mold gate (not shown). Spring retainer 215 contains threads on an outer surface which are complementary to threads in piston 706. Spring retainer 215 and piston 706 are joined together by a threaded connection 717.

In the embodiment of FIG. 7, magnet holder 206 is disposed within a forward end of chamber 229 of spring retainer 215 and has forward facing surface 231 seated against a shoulder 721 of a bore 714 in piston 706.

When piston 706 is actuated in the opening direction OS, the force of magnetic attraction between magnet 134 and valve pin holder 210 transfers the rearward movement of piston 706 to valve pin holder 210 thereby simultaneously actuating valve pin 120 and piston 706 in the opening direction OS. Conversely, when piston 706 is actuated in the closing direction CS, the biasing force between spring 134 and magnet holder 206 transfers the forward movement of piston 706 to valve pin 120 through magnet 136 and valve pin holder 210 thereby simultaneously actuating valve pin 120 and piston 706 in the closing direction CS.

In operation, if valve pin 120 encounters a stopping force $S_F$, as discussed elsewhere herein, when piston 706 is actuated in the opening direction OS, the force of magnetic attraction $F_M$ between valve pin holder 210 and magnet 136 is overcome, and valve pin holder 210 decouples from magnet 136 and is slidable within bore 714 of piston 706 to permit piston 706 to continue in the opening direction OS. Shoulder 721 acts a stop to limit forward longitudinal movement of magnet holder 206 during the decoupling process. The decoupling between magnet 136 and valve pin holder 210 allows valve pin 120 to remain stationary as the piston 706 continues in the opening direction OS. Likewise, if valve pin 120 encounters a stopping force $F_S$, as discussed elsewhere herein, when piston 706 is actuated in the closing direction CS, spring 134 compresses to reduce the force applied to valve pin 120. The compression of spring 134 within spring retainer 215 allows valve pin 120 to remain stationary or to move a distance in the closing direction CS that is less than the distance moved by piston 706 in the closing direction CS. As such, the compression of spring 134 dampens or absorbs some or all the stopping force $F_S$ experienced by valve pin 120.

If valve pin 120 encounters no stopping forces during actuation of piston 706 in either the opening or closing direction, spring-magnet coupling 724 remains intact as depicted in FIG. 7.

Materials and manufacturing techniques for making the embodiments of the present invention described herein may be those used in the injection molding industry and related industries.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding apparatus, comprising:
   an actuated part movable in forward and rearward directions;
   a coupling part attached to the actuated part and having a spring coupling and a magnetic coupling connected in series; and
   a valve pin coupled to the coupling part to be movable with the actuated part, the valve pin extending in the forward direction for opening and closing a mold gate,
   wherein when the actuated part is moved in one of the forward and rearward directions and the valve pin experiences a stopping force, a spring of the spring coupling is positioned for dampening the stopping force encountered by the valve pin.

2. The injection molding apparatus of claim 1, wherein the spring coupling comprises a spring retainer fixed to the actuated part and the spring exerts a spring force between a forward facing inner surface of the spring retainer and the valve pin.

3. The injection molding apparatus of claim 2, wherein the magnetic coupling is positioned between the spring of the spring coupling and the valve pin and wherein the valve pin is coupled to the magnetic coupling via magnetic attraction.

4. The injection molding apparatus of claim 3, wherein when the valve pin experiences a stopping force greater than a predetermined threshold as the actuated part is moved in the forward direction, the spring of the spring coupling compresses to limit or prevent continued movement of the valve pin in the forward direction.

5. The injection molding apparatus of claim 4, wherein when the valve pin experiences a stopping force greater than a predetermined threshold as the actuated part is moved in the rearward direction, the magnetic coupling decouples from the valve pin to limit or prevent continued movement of the valve pin in the rearward direction.

6. The injection molding apparatus of claim 3, wherein the magnetic coupling is comprised of a magnet holder for holding a magnet and a rearward facing surface of the magnet holder is in contact with a forward end of the spring.

7. The injection molding apparatus of claim 6 further comprising:
   a valve pin holder coupled to the magnet holder of the magnetic coupling via magnetic attraction therebetween, the valve pin being coupled to the valve pin holder.

8. The injection molding apparatus of claim 7, wherein the magnet holder is disposed within a forward end of the spring retainer and has a forward facing surface seated against a shoulder of a bore within the actuated part.

9. The injection molding apparatus of claim 8 further comprising:
   a washer positioned between the forward facing surface of the magnet holder and the forward end of the first spring for adjusting a longitudinal position of the valve pin relative to the mold gate.

10. The injection molding apparatus of claim 1, wherein the spring of the spring coupling is received within a bore in the actuated part such that a head portion of the valve pin is positioned between the magnetic coupling and a rearward end of the spring.

11. The injection molding apparatus of claim 10, wherein the magnetic coupling is coupled to the actuated part and the valve pin via magnetic attraction.

12. The injection molding apparatus of claim 11, wherein when the valve pin experiences a stopping force greater than a predetermined threshold as the actuated part is moved in the rearward direction, the spring of the spring coupling compresses to limit or prevent continued movement of the valve pin in the rearward direction.

13. The injection molding apparatus of claim 12, wherein when the valve pin experiences a stopping force greater than a predetermined threshold as the actuated part is moved in the forward direction, the magnetic coupling decouples from the actuated part to limit or prevent continued movement of the valve pin in the forward direction.

14. The injection molding apparatus of claim 11, further comprising:
a valve pin holder slidably received within the bore of the actuated part, wherein the head portion of the valve pin is coupled to the valve pin holder and the valve pin holder is attached to the magnetic coupling via magnetic attraction therebetween.

15. The injection molding apparatus of claim 1, wherein the actuated part is one of a valve pin plate and a piston of an actuator.

* * * * *